United States Patent
Sun et al.

(10) Patent No.: US 9,671,512 B2
(45) Date of Patent: Jun. 6, 2017

(54) INVERSION-BASED REFLECTOR DIP ESTIMATION

(71) Applicants: Hongchuan Sun, Spring, TX (US); Feng Deng, Houston, TX (US); Carey M. Marcinkovich, The Woodlands, TX (US)

(72) Inventors: Hongchuan Sun, Spring, TX (US); Feng Deng, Houston, TX (US); Carey M. Marcinkovich, The Woodlands, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 169 days.

(21) Appl. No.: 14/491,538

(22) Filed: Sep. 19, 2014

(65) Prior Publication Data
US 2015/0117144 A1    Apr. 30, 2015

Related U.S. Application Data

(60) Provisional application No. 61/897,022, filed on Oct. 29, 2013.

(51) Int. Cl.
*G01V 1/34*    (2006.01)
*G01V 1/28*    (2006.01)
*G01V 1/30*    (2006.01)

(52) U.S. Cl.
CPC ........ *G01V 1/303* (2013.01); *G01V 2210/514* (2013.01); *G01V 2210/522* (2013.01); *G01V 2210/6222* (2013.01)

(58) Field of Classification Search
CPC .......... G01V 1/303; G01V 2210/6222; G01V 2210/522; G01V 2210/514
USPC ..................................... 367/7, 53
See application file for complete search history.

(56) References Cited

U.S. PATENT DOCUMENTS

| 6,850,864 B2 | 2/2005 | Gillard et al. |
| 7,454,292 B2 * | 11/2008 | Wang ................. G01V 1/28 250/256 |
| 7,672,824 B2 | 3/2010 | Dutta et al. |
| 2012/0241166 A1 | 9/2012 | Sun |

OTHER PUBLICATIONS

Bleistein, N. et al. (1990), "Stacking of Narrow Aperture Common Shot Inversions," *SIAM J. Appl. Math.* 50(2), pp. 569-594.
Kane, J. et al. (2001), "Simultaneous least squares deconvolution and kriging using conjugate gradients," *Earth Doc.*, 16 pgs.
(Continued)

*Primary Examiner* — Daniel L Murphy
(74) *Attorney, Agent, or Firm* — ExxonMobil Upstream Research-Law Department

(57) ABSTRACT

Method for estimating reflector dips in a window of post stack image traces (51) of seismic data for use in velocity tomography (57). The method iteratively (56) flattens (55) the image traces against a specified reference trace through the application of conjugate-gradient least-squares inversion (53). Different from other dip estimation methods which emphasize on strong-amplitude reflectors, the inventive method automatically inverts for the reflector dip for every grid point in the image window.

14 Claims, 6 Drawing Sheets

(56) References Cited

OTHER PUBLICATIONS

Kurin, E. et al. (2003), "An algorithm for semi-automated traveltime picking based on the non-hyperbolic moveout," *SEG Expanded Abstracts*, pp. 2168-2170.
Lee, R.F. (2001), "Pitfalls in seismic data flattening," *The Leading Edge* 20, pp. 160-164.
Lomask, J. et al. (2006), "Flattening without picking," *Geophysics* 71(4), pp. P13-P20.
Siliqi, R. et al. (2007), "High Order RMO Picking using uncorrelated parameters," *SEG Expanded Abstracts*, pp. 2772-2775.
Sun, H. et al. (2001), "2-D wavepath migration," *Geophysics* 66(5), pp. 1528-1537.

* cited by examiner

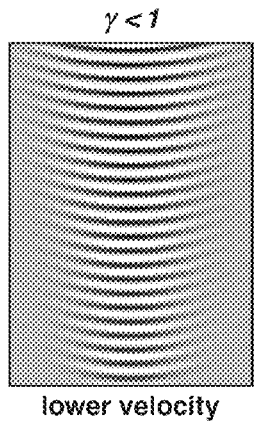
lower velocity
FIG. 1A
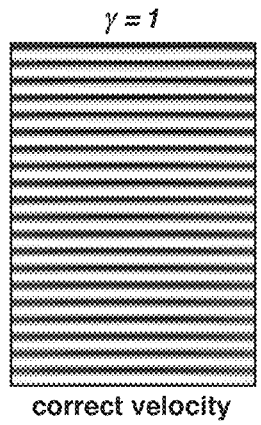
correct velocity
FIG. 1B
*(Prior Art)*
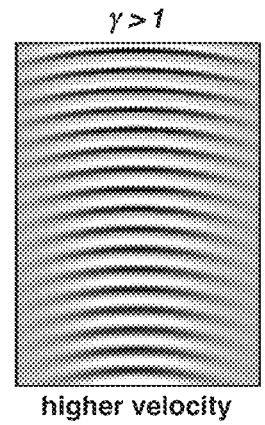
higher velocity
FIG. 1C
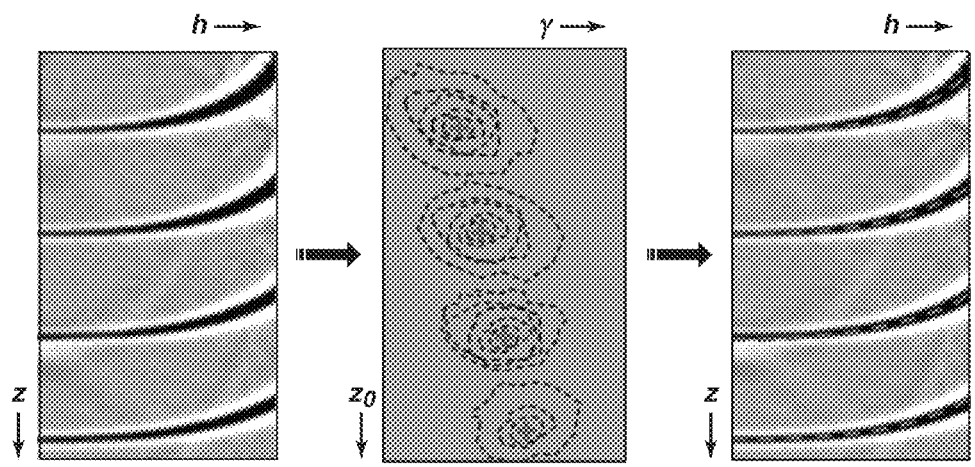
FIG. 2A  FIG. 2B  FIG. 2C
*(Prior Art)*

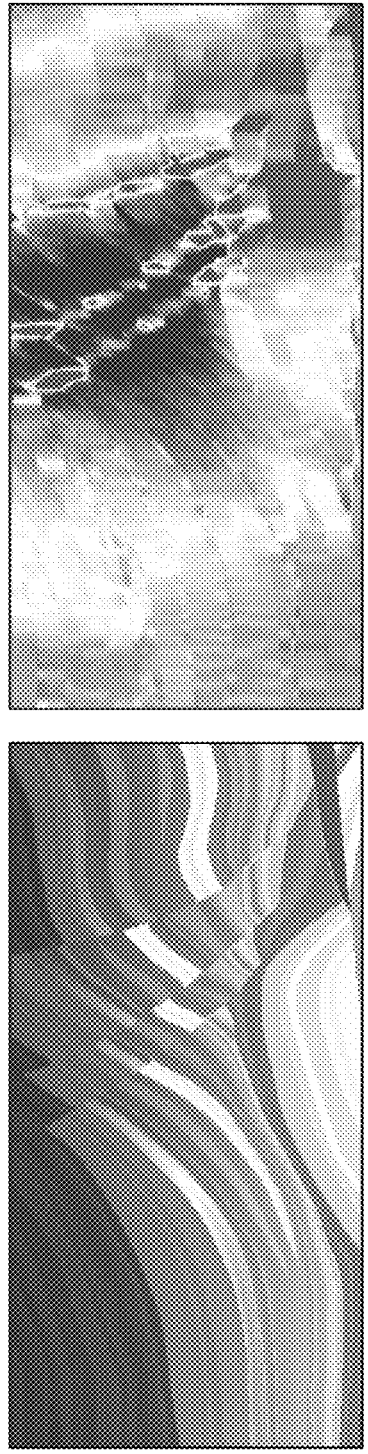
FIG. 7A
FIG. 7B
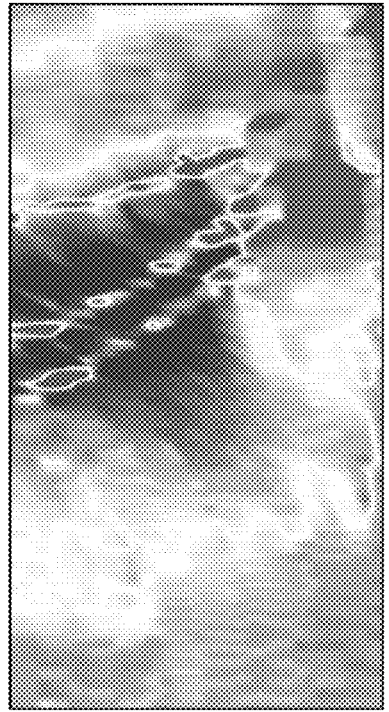
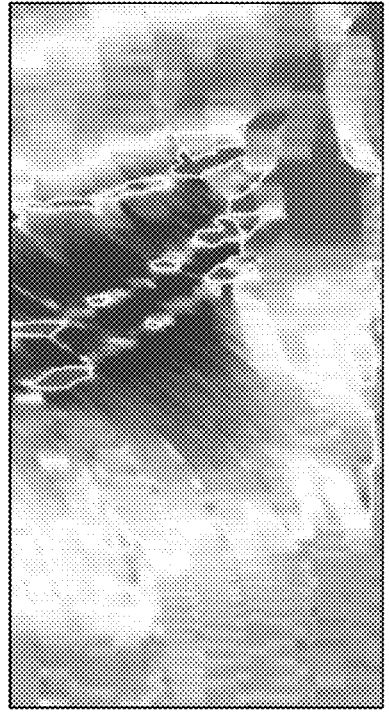
FIG. 7C
FIG. 7D

INVERSION-BASED REFLECTOR DIP ESTIMATION

CROSS-REFERENCE TO RELATED APPLICATION

This application claims the benefit of U.S. Provisional Patent Application 61/897,022, filed Oct. 29, 2013, entitled INVERSION-BASED REFLECTOR DIP ESTIMATION, the entirety of which is incorporated by reference herein.

FIELD OF THE INVENTION

The invention relates generally to the field of geophysical prospecting for hydrocarbons and, more particularly, to seismic data processing. Specifically, the invention is a method and system to provide a reliable and robust inversion for high-resolution reflector dip estimation.

BACKGROUND OF THE INVENTION

Data from seismic surveys are used in hydrocarbon exploration. A main purpose of imaging in seismic data processing is to place subsurface reflectors in their correct relative spatial relationships to provide an accurate image of a target exploration area. Imaging requires an accurate subsurface acoustic velocity model. A typical velocity model building cycle consists of three steps: migration imaging of seismic data to generate subsurface common image gathers; picking of residual moveouts in the common image gathers; and tomographic inversion for velocity updates using the picking results as input data.

Seismic tomography methods are commonly used to construct the subsurface velocity model of a target exploration area. A typical velocity tomography method requires three inputs: an initial velocity model obtained from well logs and stacking velocity analysis, depth residuals estimated from pre-stack common image gathers, and reflector dip angles estimated from the post-stack image. Reflector dip angles are often used to control the direction of rays along which velocity perturbations are back-projected, and thus can have great impact on the final model to be constructed.

Different from pre-stack common image gathers, which normally contain flat events at near offsets so that picking methods can have a good starting trend to follow, a post-stack image that has been migrated from premature velocity models can be extremely noisy. This is why conventional slant-stack-type reflector dip estimation methods often suffer from conflicting dips and wild swings. A more stable alternative for dip estimation is to manually pick interfaces on the image, followed by computing dip angles along the interfaces being picked and then interpolating between adjacent interfaces to cover the entire image. Obviously, this strategy is not only time-consuming, but also inaccurate for complex interlayer structures.

When seismic traces with different offsets (source-receiver spacing) are migrated and then stacked together, the final output is a post-stack image. This stacked image consists of true reflectors which represent true subsurface geological structures, pseudo reflectors which are coherent migration noise, and random migration noise. To estimate the dip angles of true reflectors, one needs a robust algorithm that does not suffer from strong coherent migration swings and generally low signal-to-noise ratio of the image. The present invention takes advantage of a constrained global inversion technique, which is similar to the residual moveout estimation method described in Sun, "Residual moveout estimation through least squares inversion," (U.S. Publication No. 2012024166, 2011). This publication is incorporated by reference herein in all jurisdictions that allow it.

To estimate residual moveout, a common image gather is used as the input to the inversion algorithm. Each common image gather has two coordinate axes, vertically the depth, and horizontally the offset. The common image gather is flattened using an inversion algorithm, and the depth shifts between the input gather and the flattened gather are the residuals to be estimated. Similarly, this invention extracts a window of traces from the post stacked image and the window is centered about the reference trace at which we need to estimate the reflector angles for image points along the vertical depth axis. The objective is to flatten all reflectors within the trace window, and the rotation angle between the input reflector and the flattened reflector is the dip angle that we are trying to compute.

To flatten the selected window of traces, we first need to estimate the depth shifts along each reflector. A widely used manual picking technology assumes that each reflector can be approximated by a hyperbolic or parabolic curve. As a result, a selection of the hyperbolic or parabolic curvature is equivalent to the picking of the entire reflector. When the post stack image is contaminated with strong noise, this manual picking method is relatively reliable because users can discriminate between signal and coherent noise using their interpretation knowledge. However, this method is very time consuming which in practice often makes 3-D model building unaffordable. To estimate the depth residuals of all reflectors more efficiently, some automatic picking algorithms have been developed, among which cross-correlation is widely used. These algorithms are computationally efficient, but they tend to generate local solutions to the depth shifts. Furthermore, their solutions are sensitive to the size of the cross-correlation window and are vulnerable to the signal-to-noise ratio of the input image traces.

As noted above, most existing dip angle estimation methods are either time consuming or not reliable. Reliability is critical to the entire iterative model building process because the reflector dips are take-off angles of ray tracing which is used by tomographic inversion and the model updates depend to a considerable degree on how the rays are shot. An objective of the present invention is to efficiently and reliably estimate the reflector dip angles, which ultimately will help to improve the final model building quality.

Existing Technology

U.S. Pat. No. 7,672,824 to Dutta et al. ("Method for shallow water flow detection") describes an elastic waveform inversion method for building velocity. It is not a dip estimation method.

"Stacking of narrow aperture common shot inversions," by Bleistein and Cohen (*J. Appl. Math.* 50, 569-594 (1990)), describes a common shot inversion method for better image stacking. It also is not a dip estimation method.

U.S. Pat. No. 6,850,864 to Gillard et al. ("Method for analyzing dip in seismic data volumes") describes a method that directly computes the arctangent of the ratio of the horizontal and vertical gradient, followed by comparing with other possible dips. This is a dip scan method which is highly efficient and is very accurate for clean data. However, it is sensitive to the window size and the data S/N ratio, and leads to a local solution to the dip estimation problem.

Lee (2001) describes how to avoid pitfalls in seismic data flattening. This method attempts to determine the bed thickness and reconstruct the paleosurfaces, both of which are important parts of seismic interpretation. For instance, meandering channels are better focused on a horizontal slice with data flattening being taken into account. To flatten the data, however, horizons need to be picked throughout the entire data volume which turns out to be very time consuming.

Lomask et al. (2006) present an efficient dense-picking method for flattening seismic data. This method first estimates local dips of pre-stack seismic events, then converts the local dips into time shifts. Their paper contains applications to pre-stack data volumes, not post-stack image or image gathers to which model building is closely related. The quality of their flattening results can be heavily affected by noise in the data where coherent crossing events cannot be effectively handled. In addition, when applied to reflector dip estimation, this method may not converge to the global minima.

Siliqi et al. (2007) introduces an automatic picking technique for dense estimation of high order residual moveout curves. This method uses Taylor series expansions to approximate the real curvature of the event and requires that the curvature is smooth enough so that lower terms of the Taylor series can be successfully fit. As a result, this method is less effective for post stack image with high frequency noise and complex curvatures.

Kurin and Glogovsky (2003) developed a technique to pick seismic events for normal moveout analysis. Their paper presents a practical approach to the travel-time picking which accounts for the fourth-order term in the common mid-point normal moveout formula. The addition of the fourth-order term to the conventional hyperbolic equation helps to improve the picking results in case non-hyperbolic events exist in the data. However, the approach relies on a successful fitting of the hyperbola and is not practical for post stack image with complicated structures. In addition, their algorithm is only semi-automated and needs a longer turn-around time to allow for user input to guide the algorithm.

There is therefore a need for a technique that is computationally efficient, has no hyperbolic or parabolic assumption, and at the same time is robust and reliable for computing high-resolution complex reflector dip angles in the post stack migration image.

SUMMARY OF THE INVENTION

In one embodiment, the present invention is automated method for estimating reflector dips in a selected window of post-stack image traces of seismic data, comprising flattening the image traces using dip fields obtained and optimized through computer-implemented iterative inversion of the image window.

In a second embodiment, the invention is a computer-implemented method for transforming seismic data into a post-stack image showing structural features of a subsurface region, comprising:

building an initial seismic wave velocity model in the subsurface region;

applying a depth imaging algorithm to the seismic data to generate a post-stack image made up of image traces;

estimating reflector dips in a window of the seismic image traces, comprising flattening the image traces using reflector dips obtained and optimized through computer-implemented iterative inversion of the image window;

using the optimized reflector dips in a tomography method to construct a model of seismic wave velocity in the subsurface region; and using the model of seismic wave velocity to migrate the seismic data and thereby produce an image showing structural features of the subsurface region.

Non-limiting embodiments can also include using the estimated reflector dips in a tomography method to construct a model of seismic wave velocity in the subsurface region, then using the model of seismic wave velocity to migrate the seismic data and produce an image showing structural features of the subsurface region, and then using the image showing structural features to prospect for hydrocarbons in the subsurface region.

BRIEF DESCRIPTION OF THE DRAWINGS

The present invention and its advantages will be better understood by referring to the following detailed description and the attached drawings in which:

FIGS. 1A-1C illustrate the relationship between the migration velocity and the hyperbolic curvature in a common image gathers;

FIGS. 2A-2C illustrate how to pick curvatures through hyperbolic assumption;

FIGS. 7A-7D illustrate application of the present inventive method to a dip estimation based on the Marmousi velocity model: (A) the input velocity model, (B) dip field inverted using a smooth factor of 1, (C) dip field inverted using a smooth factor of 10, and (D) dip field inverted using a smooth factor of 20.

Due to patent law restrictions on the use of color, FIGS. 2B-2C, 6A-6B, and 7A-7D are black-and-white reproductions of color originals. The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 6A:
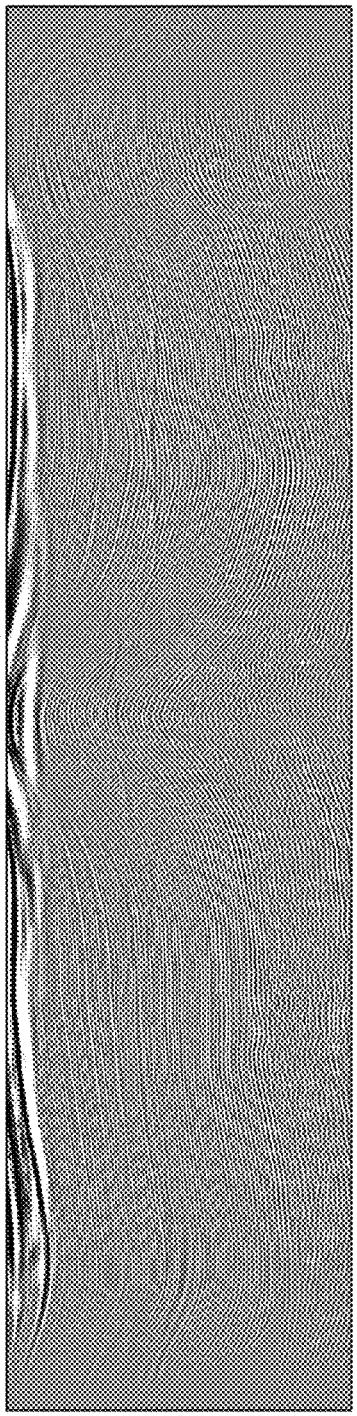
FIGS. 6A-6B show a test example of a dip estimation of a post stack migration image using the present inventive method: (A) the input stack image, (B) dip fields after inversion.

As discussed in detail below, the disclosed embodiments relate generally to a reflector dip estimation method. This method may be utilized to iteratively flatten reflectors through conjugate-gradient least-squares inversion, wherein the gradients, local coherence, and reflector dip field may be computed and stored on every grid point in the CDP-depth or CDP-time domain (CDP means common-depth point) and they may be updated as the iteration proceeds. By way of basic explanation, the seismic data that are used as input to the present inventive method are a post-stack CDP image. Image means that the measured seismic data have been migrated by data processing so that subsurface reflectors appear at their correct depths. Post-stack means that seismic traces from many different receiver locations and source locations have been added together. A CDP stack means a sum of traces corresponding to the same depth point. FIG. 6A shows an example of a post-stack CDP image. The vertical axis is depth (or time) and the horizontal dimension shows the location of the common depth point of the stacked data traces. Seismic data represented in this way is said to be in the CDP-depth or CDP-time domain.

The techniques disclosed herein provide reliable estimates of reflector dips for tomography so that depth residuals can be back-projected to their correct ray paths to provide a more accurate velocity model. The present techniques are robust enough to handle wild reflector dips. That is, it is less sensitive to the signal to noise (S/N) ratio of the input data, and is also less sensitive to the size of the smoothing window. Also, this technology may be utilized with stacked image and velocity model processing of seismic data. Further still, the present techniques may be utilized for stratigraphic interpretation, fast target-oriented migration, and noise attenuation.

In one or more embodiments, the method provides a reliable and robust inversion for high-resolution reflector dip estimation. The method includes iteratively rotating/flattening the reflectors through conjugate-gradient, least-squares inversion, and wherein the gradients, local coherence, and reflector dip field are iteratively computed in the CDP-depth or CDP-time domain and they are updated as the iteration proceeds. That is, the method may use a post-stack image with the application of a least-squares inversion scheme to iteratively invert for the enhanced reflector dip angles along which the preferred local coherence can be achieved. Unlike other techniques, such as a slant-stack technique that treats the reflector as isolated grid points and locally scans for the optimal dip for each point, the present inventive method utilizes a vertically continuous image trace to provide a stable solution to the dip angles at different depths. Also, in contrast to the interface-based methods, which compute dip angles only on the picked interfaces and then smear at other locations, the present inventive method simultaneously estimates dip angles for each of the reflectors to generate dip angles at a higher resolution. These techniques may enhance seismic data processing. In particular, the techniques disclosed herein may generate a reliable dip map of the reservoir formations, not only for the use in velocity tomography, but also for stratigraphic interpretation. That is, the present invention provides flexibility to process strong reflectors along with weak reflectors, such as sub-salt reservoirs that typically include weak reflectors.

In one or more other embodiments, the present invention may include a method that estimates the dip angle in an enhanced manner. The method may include extracting a window of traces centered about a reference trace from an associated in-line or cross-line of a post-stack image; constructing a data matrix by computing vertical gradients of image points within the window; constructing an observation vector by computing horizontal gradients of image points within the window; solving for an in-line or cross-line dip angle through least-squares inversion; rotating reflectors to a horizontal direction using dip angles obtained from the solution of the in-line or cross-line dip angle. The size of the window, i.e. the number of traces in the window, represents a balance or compromise between resolution and noise. A typical number of traces may be, for example, nine. More traces will result in a smoother output; fewer traces will be of higher resolution, but the result will be noisier. The method may also include repeating the constructing of the data matrix, constructing of the observation vector, and solving for an in-line or cross-line dip angle and rotating reflectors until residual dip angles are lessened to an acceptable level. Further, the steps may also be repeated for all traces of the image and then output the in-line and cross-line dip angles to tomography.

The least squares solution to a system of linear equations $Ax=b$ can be obtained by minimizing $\|Ax-b\|^2$, if the $L_2$ norm is selected, where A is the data matrix, b is the observation vector, and x is a vector whose components are related to the unknowns to be solved for, i.e. the optimum dip angles $\theta$, through the relationship $\theta=\arctan(x)$.

Conventional picking of moveout curvatures assumes that the moveout follows a hyperbolic or parabolic trajectory. Equation (1) is the most commonly used hyperbolic formula:

$$z^2 = z_0^2 + (\gamma^2 - 1)h^2, \tag{1}$$

where h is half offset between the source and the receiver, z is the depth of the event at h, $z_0$ is the depth of the event at reference half offset $h_0$, and $\gamma$ is the curvature of the residual moveout. FIGS. 1A-1C show three common image gathers generated using different migration velocities. In FIG. 1B, where curvature $\gamma$ is equal to 1, the common image gather is flat, suggesting that the migration velocity used to generate the image gather is correct. When $\gamma$ is less than 1 in FIG. 1A, the common image gather curves upward, suggesting that the migration velocity is lower than the correct velocity. On the other hand, when $\gamma$ is greater than 1 as shown in FIG. 1C, the common image gather curves downward, which means that the migration velocity is too high.

The hyperbolic picking process is illustrated in FIGS. 2A-2C, where FIG. 2A shows the input common image gather with offset h as the horizontal coordinate and depth z as the vertical coordinate. Hyperbolic picking needs to first transform the input gather from the (z,h) domain into $(z_0,\gamma)$ domain as shown in FIG. 2B. Then picking is conducted in the $(z_0,\gamma)$ domain by selecting peak amplitude of the contours. A pick of basically a point in the $(z_0,\gamma)$ domain (FIG. 2B) is equivalent to picking an entire residual moveout in the original (z,h) domain as illustrated in FIG. 2C.

As noted above, this conventional picking technology assumes that residual moveout follows a single hyperbolic curvature throughout the entire offset or angle range. In reality, however, it is common to observe much more complicated residual curvature because field data may contain different wave modes, and the migration velocity used may differ greatly from the true underground velocity. Nevertheless, this hyperbolic or parabolic assumption has been used by most manual picking methods and by some automatic picking methods, for instance, the automatic γ scan.

Again, the aforementioned hyperbolic picking uses partially-stacked image gathers as the input. When the input is a window of post stack CDP (common depth point) traces, which is a case for which the present invention is applicable, one first picks the γ-value and then simply converts that into the reflector dip angle. Nevertheless, when the stacked image is contaminated with strong migration noise, the quality of such manually picked reflector dips is problematic.

Figure 3:
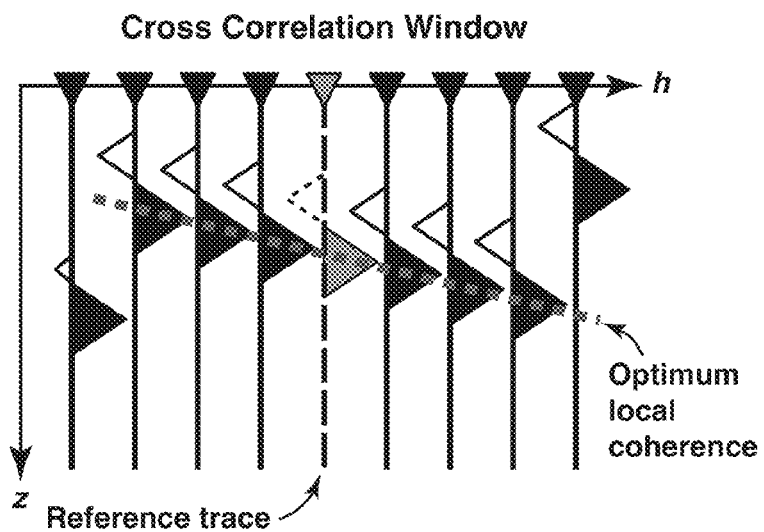
FIG. 3 illustrates how to estimate the optimum dip through cross correlation.

Many more automatic dip picking methods, however, are based on a cross-correlation technique which computes the coherency between a reference trace and its neighboring traces as illustrated in FIG. 3. To estimate the dip field using cross correlation, one typically selects a window of traces centered about the reference trace. By cross correlating the reference trace with all other traces within the window, the optimum local coherence can be obtained which is along the dashed line direction in FIG. 3. The best dip estimate is along the same direction. Obviously, this is a local solution to the residual moveout, and the dip estimation is sensitive to the size of the cross correlation window and the S/N ratio of the data.

An objective of this invention then is to find a global solution to measuring the reflector dips. It should be able to handle arbitrary reflector curvatures and should be highly efficient for 3D velocity model building.

Theory

A key idea of this invention is to iteratively flatten the traces within the working window against a specified reference trace through the application of conjugate-gradient least-squares inversion. Different from other picking methods which need to identify and track strong amplitudes, the present inventive method automatically inverts for the reflector dips for every grid point in the image window. There is no need to identify and track events in this method.

Figure 4:
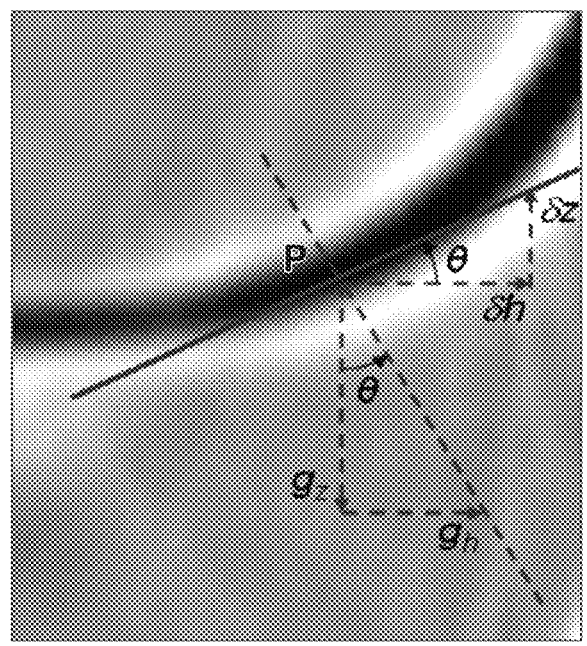
FIG. 4 illustrates how gradients and dip angle may be computed.

FIG. 4 shows a window of image traces with a single reflector. The present inventive method may start by exploiting the gradient information of the wave front. For an image point P shown in FIG. 4, $g_h$ and $g_z$ are horizontal and vertical gradients, $\delta h$ and $\delta z$ are horizontal and vertical shifts, and $\theta$ is the dip angle measured between the horizontal direction and the tangent direction of the residual moveout. The gradients can be computed by $$g_h = \nabla_h u(i,j) = \frac{\partial u(i,j)}{\partial h} \quad (2)$$

$$g_z = \nabla_z u(i,j) = \frac{\partial u(i,j)}{\partial z}$$

where $\nabla$ denotes the gradient and $u(i,j)$ represents the wave field at any location within the image window, not necessarily exactly on a reflector with strong coherence. In other words, u represents the selected input post stack image window. As stated previously, this is the pressure data measured by seismic receivers as a function of time, but after being transformed by migration and stacking to the image domain (depth-CDP), from which a window is selected consisting of traces having a common image point. The depth residual can then be obtained by computing $$\delta z = \delta h \tan\theta = \delta h \frac{\nabla_h u(i,j)}{\nabla_z u(i,j)} \quad (3)$$

It is well known that a conventional inversion equation may be written as Ax=b, where x is the unknown to be solved for. For the case of reflector dip estimation, obviously x is, or is related to, the dip angle. Thus, the inversion equation becomes $$A\delta z = b \quad (4)$$

To construct an inversion system so that it is in the same form as equation (4), we simply need to re-organize equation (3) and then get $$\nabla_z u \tan\theta = \nabla_h u \quad (5)$$

Equation (5) is the inversion system Ax=b for the specific problem of reflector dip estimation, where $$A = \nabla_z u$$

$$x = \tan\theta \quad (6)$$

$$b = \nabla_h u$$

Both x and b have m×n elements. Here m and n stand for the dimensions of the image window. Specifically, m represents the number of post stack image traces, and n represents the number of depths. Thus, the inversion system is neither over-determined nor under-determined, which guarantees a rapid convergence of the algorithm. Matrix A has m×n×m×n elements, which is large, but it is diagonal, super sparse, and turns out to be helpful for reducing memory requirement and gaining computational efficiency.

Equation (7) shows a conventional cost function in the L2-norm for a general inversion system $$E = \|Ax-b\|^2 + \lambda_0\|x\|^2 + \lambda_1\|\nabla x\|^2 \quad (7)$$

where $\lambda_0$ is the damping coefficient and $\lambda_1$ is the regularization coefficient. To handle the specific reflector dip inversion problem, a new cost function may be used in one embodiment of the present inventive method:

$$E = \|Ax-b\|^2 \approx \|W\nabla_z u C \tan\theta - W\nabla_h u\|^2 \quad (8)$$

where W(i, j) is a weighting function based on local coherence, where i=1, 2, . . . m, j=1, 2, . . . n. (Each (i j) stands for a discrete cell in the entire space of (m,n).) When the post-stack image traces are noisy, W constrains the convergence using strong and coherent events and helps guarantee the system to be stable. In equation (8), C is a pre-conditioner, which helps attenuate high frequency noise and avoid converging into local minima. The factors W and C, while preferable, are not absolutely essential to the inversion, which will typically work even if these quantities are set to unity.

Implementation

Figure 5:
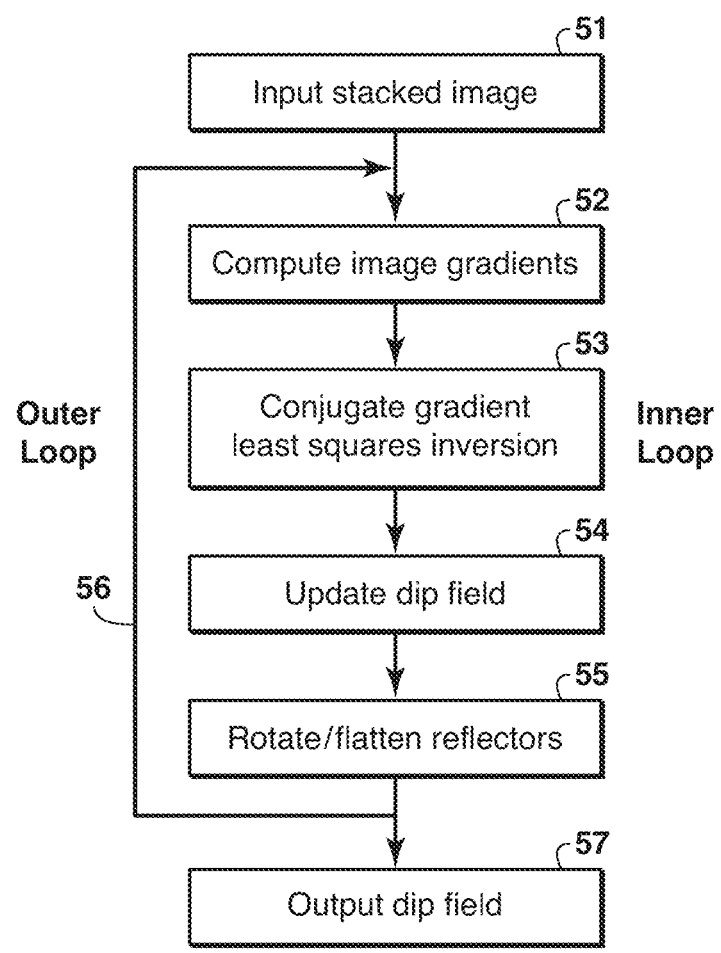
FIG. 5 is a flow chart showing basic steps in one embodiment of the present inventive method.

The present inventive method iteratively flattens the image traces based on reflector dips generated by a conjugate-gradient least-squares inversion scheme. In each iteration, reflector dips are first estimated relative to a reference CDP in the image window, and then the image traces are partly flattened against the same reference trace. As iteration proceeds, the gathers are further flattened and an optimized reflector dip field is achieved. These reflector dips will typically be provided to a tomography algorithm for future velocity inversion. Basic steps in one embodiment of the invention can be described as follows, as indicated in the flowchart of FIG. 5:

Step
51. Input a window of stacked image traces to a computer programmed to perform the following algorithm.
52. Compute horizontal and vertical gradients for every grid point.
53. Apply inversion, preferably conjugate-gradient least-squares inversion, to compute and then optimize the reflector dips.
54. Update reflector dips for every grid point in the window, i.e. at every discrete point in the depth-CDP domain.
55. Flatten or rotate the image traces against a selected reference trace by using the reflector dips to adjust the depth of the image point.
56. Repeat steps 52-55 until the traces are satisfactorily flattened.
57. Output dip field, e.g. to velocity tomography.

Figure 8:
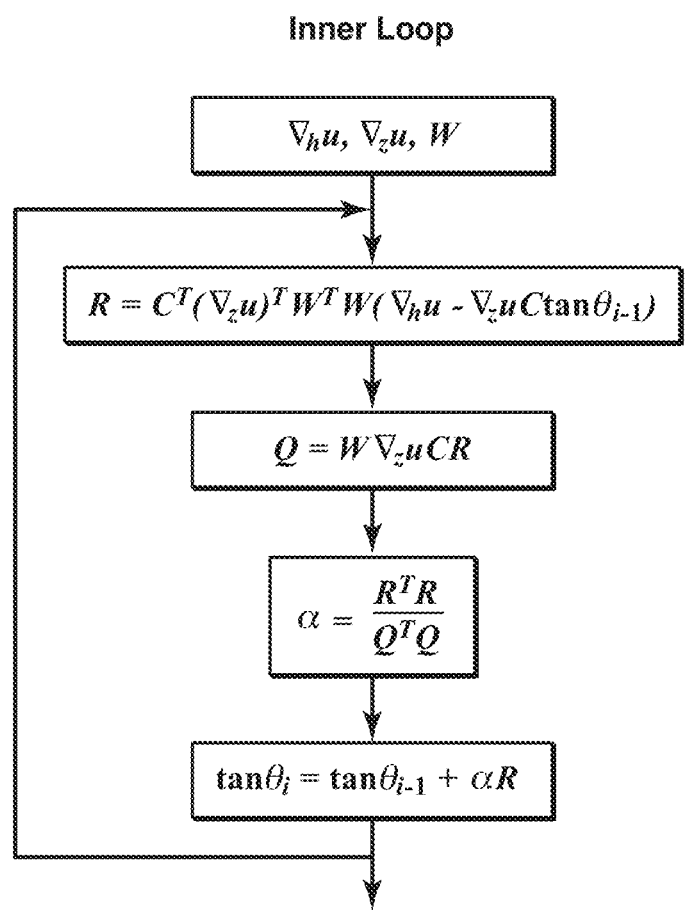
FIG. 8 is a schematic diagram showing a mathematical formulation that may be used in implementing the inner loop of FIG. 5.

After processing one window of data, the window may be moved to another CDP location where the process is repeated until eventually all CDP's are processed. FIG. 8 is a schematic diagram showing mathematical formulation that may be used in implementing the inner loop of FIG. 5.

In step 55, the specified reference trace is assumed to have the correct image depths, and the inverted reflector dips are used to correct all grid points in the depth-CDP domain, relative to the reference trace. Typically, the central trace is used as the reference trace. In the end, as the iterative process evolves, it doesn't matter which trace is specified as the reference trace. When the gather is satisfactorily flattened in step 56 is preferably judged manually by the user, although the computer software program that carries out the computations for the invention may have a default stopping point after some specified number of iterations.

EXAMPLES

Figure 6B:
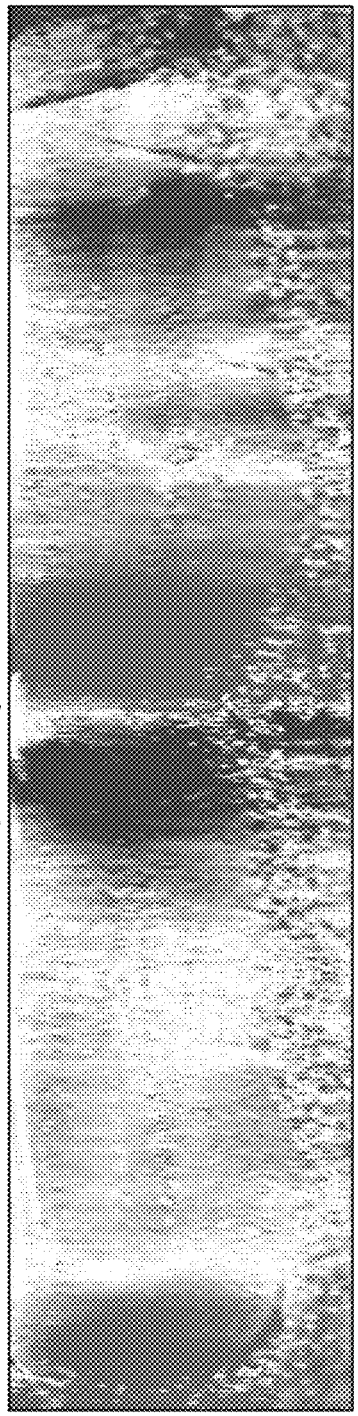

In this section, some synthetic-data test examples will be presented to demonstrate the effectiveness of the present inventive method. In FIGS. 6A-6B, depth is plotted vertically and CDP is plotted horizontally. FIG. 6A shows an input post stack image, where strong reflectors are clearly seen with variations in the dip field. (The window described above can be visualized as a very narrow—in the horizontal dimension—window that moves from left to right across FIG. 6A.) The largest change of dip angle happens at the middle part of the image, where an anticline structure extends from the top to the bottom of the image window. FIG. 6B shows the inverted reflector dips, which will be used by a tomographic inversion scheme. Notice that the large positive values of dip in FIG. 6B, denoted by red in the original color data display, match those large positive dips in FIG. 6A, and the large negative values in FIG. 6B, denoted by blue in the original color data display, match those large negative dips in FIG. 6A, suggesting that the algorithm is generating reasonable reflector dips. In addition, some fine faults are also clearly resolved in the dip field in FIG. 6B, which match the faulting structures in FIG. 6A accurately, suggesting that the present invention is capable of generating a high resolution dip field which can be used by geological interpretation.

The second example is to test the present inventive method on a complex velocity model, where we try to mimic earlier steps of a velocity model building process. FIG. 7A shows the well known Marmousi velocity model where a large faulting system exists in the middle part of the model. FIGS. 6B-6D illustrate the dip fields inverted by the present inventive method associated with different smoothing factors. Typically, smoothing of the input field helps stabilize the inversion, however, may hurt the resolution of the inversion result. While the smoothing factor changes from 1, which is rather weak, to 20, which is fairly strong, the obtained dip field does not change much, suggesting that the present inventive method is not severely affected be the smoothing factor and the inverted high resolution dip fields are trustworthy.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims. As will be evident to all people skilled in the technical field, all practical applications of the present inventive method will be performed wholly or partly using a computer, programmed in accordance with the disclosures herein.

REFERENCES

Bleistein and Cohen, "Stacking of narrow aperture common shot inversions," (*J. Appl. Math.* 50, 569-594 (1990).
Dutta et al., "Method for shallow water flow detection", (U.S. Pat. No. 7,672,824).
Gillard et al., "Method for analyzing dip in seismic data volumes", (U.S. Pat. No. 6,850,864).
Kurin, E., and Glogovsky, V., "An algorithm for semi-automated traveltime picking based on the non-hyperbolic moveout," $73^{rd}$ Annual International Meeting, SEG, Expanded Abstracts, 2168-2171 (2003).
Lee, R., "Pitfalls in seismic data flattening," *The Leading Edge* 20, 160-164 (2001).
Lomask, J., Guitton, A., Fomel, S., Claerbout, J., and Valenciano, A., "Flattening without picking," *Geophysics* 71, 13-20 (2006).
Siliqi, R. P., Herrmann, A. Prescott, and L. Capar, "High order RMO picking using uncorrelated parameters," $77^{th}$ Annual International Meeting, SEG, Expanded Abstracts, 2772-2775 (2007).
Sun, H., "Residual moveout estimation through least squares inversion", US Patent Publication 2012/0241166 (2012).

The invention claimed is:

1. An automated method for estimating reflector dips in an image window of post-stack image traces of seismic data, comprising:
    flattening the post-stack image traces against a reference trace in the post-stack image traces using reflector dips to adjust depths of image points for the post-stack image traces, wherein the reflector dips are obtained from horizontal and vertical gradients of the image points in the image window of the post-stack image made up of the post-stack image traces through computer-implemented iterative inversion that inverts for the reflector dips of every grid point in the image window;
    constructing a model of seismic wave velocity in a subsurface region from the reflector dips;
    migrating the seismic data with the model of seismic wave velocity; and
    producing an image from the migrated seismic data showing structural features of the subsurface region and prospecting for hydrocarbons according to the structural features of the subsurface region.

2. The method of claim 1, wherein the inversion is a conjugate-gradient least-squares process.

3. The method of claim 2, wherein the conjugate-gradient least-squares process comprises:
   (a) computing the horizontal and vertical gradients within the image window, at all points on a selected computational grid; and
   (b) applying iterative least-squares inversion to the horizontal and vertical gradients to compute the reflector dips.

4. The method of claim 3, further comprising calculating at least one coherence function at each of said grid points and then using the at least one coherence function as a weighting function in a cost function selected for the conjugate-gradient least-squares process, wherein the at least one coherence function constrains the iterative inversion to make it more stable.

5. The method of claim 3, wherein the horizontal and vertical gradients are computed using a space-domain finite-difference operator.

6. The method of claim 1, wherein in each iteration, the reflector dips are first estimated relative to a reference trace corresponding to a selected common depth point in the image window, followed by partly flattening the image traces against the reference trace.

7. The method of claim 1, wherein each cycle of the iterative inversion comprises flattening the image traces by rotating seismic events using the reflector dips.

8. The method of claim 1, wherein the post-stack image traces are in depth-CDP domain and are generated by a pre-stack depth imaging scheme.

9. The method of claim 1, wherein the optimizing comprises updating the reflector dips in each cycle of the iterative inversion.

10. The method of claim 1, wherein the image traces are flattened by adjusting dip angles of reflectors in the image window.

11. The method of claim 1 wherein the image traces are flattened through a vertical interpolation to alleviate a problem of waveform distortion.

12. The method of claim 1, wherein high frequency noise is removed by a band-pass filter from the image traces before the iterative inversion.

13. A computer-implemented method for transforming seismic data into a post-stack image showing structural features of a subsurface region, comprising:
   building an initial seismic wave velocity model in the subsurface region;
   applying a depth imaging algorithm to the seismic data to generate a post-stack image made up of image traces;
   estimating reflector dips in an image window of the seismic image traces, the estimating including flattening the image traces against a reference trace in the image traces using reflector dips to adjust depths of image points for the image traces, wherein the reflector dips are obtained from horizontal and vertical gradients of the image points in the image window of the post-stack image made up of the post-stack image traces through computer-implemented iterative inversion that inverts for the reflector dips of every grid point in the image window;
   constructing a model of seismic wave velocity in the subsurface region from the reflector dips;
   migrating the seismic data with the model of seismic wave velocity and producing an image showing structural features of the subsurface region; and
   prospecting for hydrocarbons according to the structural features of the subsurface region.

14. The method of claim 13, further comprising:
   conducting a seismic survey of the subsurface region;
   designing a well for the subsurface region in accordance with the structural features of the subsurface region; and
   drilling the well and producing hydrocarbons from the subsurface region.

* * * * *